US008757976B2

(12) United States Patent
Morgan

(10) Patent No.: US 8,757,976 B2
(45) Date of Patent: Jun. 24, 2014

(54) PITCH CONTROL MECHANISM

(75) Inventor: Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 606 days.

(21) Appl. No.: 13/086,876

(22) Filed: Apr. 14, 2011

(65) Prior Publication Data

US 2011/0274545 A1 Nov. 10, 2011

(30) Foreign Application Priority Data

May 6, 2010 (GB) .................................. 1007569.5

(51) Int. Cl.
*B64C 11/36* (2006.01)

(52) U.S. Cl.
USPC .......................................... 416/151; 416/156

(58) Field of Classification Search
USPC .......... 416/147, 155, 156, 158, 157 R, 157 A, 416/157 B, 159, 160, 164, 167, 168 R, 168 A
See application file for complete search history.

(56) References Cited

U.S. PATENT DOCUMENTS

| 2,850,106 | A | 9/1958 | Swan |
| 2,924,281 | A | 2/1960 | Mergen et al. |
| 2,980,188 | A | 4/1961 | Allen et al. |
| 3,004,608 | A | 10/1961 | Pond |
| 4,878,809 | A | 11/1989 | Ames |
| 5,042,966 | A | 8/1991 | Schwartz et al. |
| 5,152,668 | A * | 10/1992 | Bulman et al. ................ 416/129 |
| 5,174,718 | A | 12/1992 | Lampeter et al. |
| 5,186,608 | A | 2/1993 | Bagge |
| 5,213,471 | A | 5/1993 | Miller et al. |
| 5,242,265 | A | 9/1993 | Hora et al. |
| 5,281,094 | A | 1/1994 | McCarty et al. |
| 5,282,719 | A | 2/1994 | McCarty et al. |
| 6,059,528 | A | 5/2000 | Danielson et al. |
| 2011/0164978 | A1 | 7/2011 | Swift et al. |

FOREIGN PATENT DOCUMENTS

| EP | 1 881 176 A2 | 1/2008 |
| EP | 2 189 646 A2 | 5/2010 |
| GB | 1 041 353 | 1/1962 |
| GB | 1 384 383 | 8/1971 |
| GB | 1 375 988 | 12/1971 |
| GB | 2 071 781 A | 3/1981 |
| GB | 2 236 810 A | 4/1991 |
| GB | 2 260 821 A | 4/1993 |

(Continued)

OTHER PUBLICATIONS

Great Britain Search Report issued in Application No. GB 1007564.6, dated Aug. 5, 2010.

(Continued)

*Primary Examiner* — Richard Edgar
(74) *Attorney, Agent, or Firm* — Oliff PLC

(57) ABSTRACT

A pitch control mechanism is provided for angular displacement of propellers of a propeller assembly of an engine arrangement. The pitch control mechanism has an epicyclic gear system rotating with the propeller assembly. The pitch control mechanism further has a drive gear controlling the rotational speed of the first epicyclic input in the rotating frame of reference of the propeller assembly, a control gear controlling the rotational speed of the second epicyclic input in the rotating frame of reference of the propeller assembly, and a drive mechanism rotating with the propeller assembly. The drive mechanism accepts rotary motion from the epicyclic output to deliver an output motion which angularly displaces the propellers of the propeller assembly.

14 Claims, 2 Drawing Sheets

(56) References Cited

FOREIGN PATENT DOCUMENTS

| GB | 2 347 974 A | 9/2000 |
|---|---|---|
| WO | WO 91/09774 | 7/1991 |
| WO | WO 91/09775 | 7/1991 |
| WO | WO 98/22340 | 5/1998 |
| WO | WO 99/20522 | 4/1999 |

OTHER PUBLICATIONS

Great Britain Search Report issued in Application No. GB 1007569.5, dated Aug. 31, 2010.
Great Britain Search Report issued in Application No. GB 0002681.5, dated Jul. 14, 2000.
Great Britain Search Report issued in Application No. GB 1007567.9, dated Aug. 19, 2010.
U.S. Appl. No. 13/086,795, filed Apr. 14, 2011, Andrew Swift, et al.
U.S. Appl. No. 13/086,880, filed Apr. 14, 2011, Andrew Swift, et al.
U.S. Appl. No. 13/086,866, filed Apr. 14, 2011, Antony Morgan.
Mar. 3, 2014 Notice of Allowance issued in U.S. Appl. No. 13/086,880.
Feb. 11, 2014 Notice of Allowance issued in U.S. Appl. No. 13/086,795.
Feb. 7, 2014 Notice of Allowance issued in U.S. Appl. No. 13/086,866.

* cited by examiner

PITCH CONTROL MECHANISM

The present invention relates to a pitch control mechanism, and more particularly to a pitch control mechanism for angular displacement of propellers of a propeller assembly.

Aero propellers, either single rotor or contra-rotating, usually have a means of varying the blade pitch via a pitch control mechanism (PCM), to optimise efficiency of thrust delivery and to reduce noise throughout the flight envelope, to provide reverse thrust, and to be able to feather the blades to control drag and rotor speed in some powerplant failure cases. There are a number of established ways of configuring a PCM, but all feature a source of power, prime mover, mechanism from prime mover to blade, and typically a failsafe system. The power source can be in the static or rotating field, although it is more common for it to be in the static field to avoid static to rotating control communication issues and for easier line replacement of faulty components. However, where the power source is in the static field, a means of transferring the power to the rotating field(s) is required.

For a static electrical power source the transfer is typically achieved via slip rings. These are used on single propeller assembly turboprop engines. However, they suffer from a high maintenance burden. Further, on an engine having two contra-rotating propeller assemblies, and particularly such an engine where the exhaust is ducted under the propeller blade roots, the slip rings would experience very high operating speeds which would significantly reduce slip ring life. The high speeds result from a need to locate the rings at large radial distances in a non-oily zone, as well as from the high relative speeds caused by contra-rotation. Thus slip rings are not seen as a viable solution for power source transfer in contra-rotating propeller assemblies.

For a static hydraulic power source, the transfer can be achieved by rotating hydraulic couplings. For example, in a single rotor engine arrangement, the propeller assembly may be driven by a hollow propeller shaft. A rotating hydraulic coupling can be provided at one end of the propeller shaft, with hydraulic supply lines running inside the shaft from the coupling to a PCM prime mover (e.g. a hydraulic actuator) adjacent the propeller blades. The propeller shaft, supply lines and prime mover are all in the rotating field. A hydraulic pressure power source, which is in the static field, supplies hydraulic fluid to the coupling, and thence to the supply lines.

However, a fundamental design constraint on a rotating hydraulic coupling is that the product (PV) of static to rotating interface velocity (V) and hydraulic pressure (P) should be kept within limits to maintain seal life, assuming positive sealing is necessary. Since propeller rotational speed is generally predetermined, reducing the diameter of the rotating interface is thus of prime importance. Even in circumstances where some leakage is permissible from the rotating hydraulic coupling, reducing the rotating interface diameter helps to decrease the amount of that leakage.

Turboprop engines, whether having a single propeller assembly or two contra-rotating propeller assemblies, employ a reduction gearbox. As shown schematically in FIG. 1, such a gearbox 1 can be of a step-aside shaft configuration in which a drive shaft 2 extending from the free power turbine 3 of the engine 4 is laterally offset from the propeller shaft 5 of the propeller assembly 6. In this configuration, a small diameter, and hence low PV value and low leakage hydraulic coupling 7 may be located at the rear of the gearbox on the end of the propeller shaft, which is hollow. As described above, supply lines 8 can run along the inside of the propeller shaft to supply a hydraulic actuator 9, which rotates with the propeller assembly, with hydraulic fluid from a static hydraulic pressure power source 10.

Alternatively, as shown schematically in FIG. 2, the gearbox 1 can be of a coaxial epicyclic configuration, in which typically a sun gear of the gearbox is driven by and coaxial with the drive shaft 2 extending from the free power turbine 3 of the engine 4. However, as the axis of the propeller, gearbox and gas generator are coincident, it is more problematic to arrange for a small diameter hydraulic coupling 7 with an acceptably low PV value and low leakage rate because the static part of the coupling is outside the propeller shaft 5 outer diameter.

EP A 1881176 proposes an arrangement for transferring hydraulic power from a static hydraulic power source to the respective hydraulic actuators of a contra-rotating turboprop engine which avoids the need for rotating hydraulic couplings, even though the engine has in-line coaxial epicyclic gear assembly. In the arrangement, the hydraulic actuators are statically mounted, and the power transfer between the static and rotating fields is achieved by rolling element thrust bearings and associated transfer rods. More particularly, to transfer power to the propeller blade angle adjustment mechanism of the second propeller assembly which is on the other side of the gear assembly from its hydraulic actuator, a first set of transfer rods extend from rolling element thrust bearings at the statically mounted hydraulic actuator through the carrier of the gear assembly planetary gears. As the carrier rotates with the first propeller assembly, a second set of transfer rods then extend from further rolling element thrust bearings between the two sets of rods to the contra-rotating, blade angle adjustment mechanism of the second propeller assembly.

It would be desirable to provide an alternative pitch control mechanism which can avoid the need for rotating hydraulic couplings or slip rings.

Accordingly, a first aspect of the present invention provides a pitch control mechanism for angular displacement of propellers of a propeller assembly of an engine arrangement, the pitch control mechanism having:

an epicyclic gear system rotating with the propeller assembly and comprising a sun gear, one or more planet gears engaging the sun gear, a ring gear engaging the planet gears, and a planet carrier carrying the planet gears, one of the sun gear, the ring gear and the planet carrier being a first input to the epicyclic gear system, another of the sun gear, the ring gear and the planet carrier being a second input to the epicyclic gear system, and the last of the sun gear, the ring gear and the planet carrier being an output from the epicyclic gear system, a drive gear located on a static structure of the engine arrangement, and controlling the rotational speed of the first epicyclic input in the rotating frame of reference of the propeller assembly, a control gear located on a static structure of the engine arrangement, and controlling the rotational speed of the second epicyclic input in the rotating frame of reference of the propeller assembly, and a drive mechanism rotating with the propeller assembly, the drive mechanism accepting rotary motion from the epicyclic output to deliver an output motion which angularly displaces the propellers of the propeller assembly;

wherein varying a rotation of at least one of the drive gear and the control gear varies the direction of rotation of the epicyclic output, and thereby changes the output motion delivered by the drive mechanism to control the angular displacement of the propellers of the propeller assembly.

Advantageously, the pitch control mechanism enables the transfer of mechanical pitch control signals (via the varying a rotation of at least one of the drive gear and the control gear) across the rotating interface between the static structure and the propeller assembly.

The engine arrangement may have any one or, to the extent they are compatible, any combination of the following optional features.

Conveniently, the ring gear can be the first epicyclic input, the planet carrier can be the second epicyclic input, and the sun gear can be the epicyclic output. Advantageously, this arrangement can be implemented with little or no additional gearing between the sun gear and the drive mechanism. In another arrangement, however, the planet carrier could be the epicyclic output with the sun gear being the input, but in this case additional gearing may be needed to transmit rotary motion from the control gear to the sun gear.

Typically, varying the direction of rotation of only one of the drive gear and the control gear varies the direction of rotation of the epicyclic output. For example, one of the drive gear and control gear can be static and the other of the drive gear and control gear can be variably rotatable. Preferably, the control gear is static and the drive gear is variably rotatable.

Conveniently, the gear ratio of the drive gear to the first epicyclic input and the gear ratio of the control gear to the second epicyclic input can be selected such that, when both the drive gear and the control gear are static, the epicyclic output is static in the rotating frame of reference of the propeller assembly. In this way, when both the drive gear and the control gear static, there can be no angular displacement of the propellers.

Preferably, the drive mechanism comprises a screw and an actuation member which is threadingly but non-rotatably engaged to one end of the screw. For example, the screw and the actuation member can form a ball or roller screw arrangement, the threading engagement of the actuation member to the screw being mediated by ball or roller bearings. The other end of the screw can then accept rotary motion from the epicyclic output, and the rotary motion can be converted into translational output motion of the actuation member. However, other arrangements can be adopted for transferring rotary motion from the epicyclic output to an actuation member.

Preferably, the actuation member is, or is operatively connected to, a unison ring which is coaxial with the propeller assembly. The unison ring can then operate drive systems for angular displacement of respective propellers. For example, each drive system operated on by the unison ring can conveniently comprise a lever arm or cam follower at the end of a quill shaft extending from the base of the respective propeller. Translating the unison ring in the axial direction of the propeller assembly thus turns the lever arm or cam follower to vary the pitch of the propeller. Advantageously, the unison ring can be installed coaxially to the propeller assembly, but not in the central zone along its rotational is axis, which zone is not always available in engines having in-line propeller arrangements. More particularly, the pitch control mechanism can be used to control the pitch of the forward propeller assembly of a propeller engine with a pair of contra-rotating "pusher" propeller blade assemblies driven by an in-line gear assembly, or the rear propeller assembly of a propeller engine with a pair of contra-rotating "puller" propeller blade assemblies driven by an in-line gear assembly.

Preferably, the pitch control mechanism further has an electric motor for powering the variable rotation of at least one of the drive gear and the control gear. Typically, the electric motor powers the variable rotation of the drive gear, the control gear usually being static.

A second aspect of the invention provides an engine arrangement having:
a first propeller assembly, and
a first pitch control mechanism according to the first aspect for angular displacement of propellers of the first propeller assembly.

The engine arrangement may have any one or, to the extent they are compatible, any combination of the following optional features.

The engine arrangement may further have:
a gear assembly that drives the first propeller assembly, the gear assembly being driven by a power drive shaft that joins to the gear assembly at a first side thereof, the power drive shaft having a longitudinally extending internal cavity,
a static conduit which extends along the internal cavity of the power drive shaft, the conduit penetrating the gear assembly such that a portion of the conduit projects from an opposing second side of the gear assembly;
wherein the drive and control gears of the first pitch control mechanism are mounted to the projecting portion of the static conduit such that a first power line for powering the variable rotation of at least one of the drive gear and the control gear can be routed along the static conduit.

For example, when the first pitch control mechanism further has an electric motor for powering the variable rotation, the motor can be mounted to the projecting portion of the static conduit, and the first power line can be an is electrical power line extending to the motor. The motor is thus adjacent the drive and control gears, and the static conduit provides a convenient means for extending the power line to the motor.

The arrangement can be used for engines having a single propeller assembly. However, preferably the engine arrangement is for a contra-rotating engine, the arrangement further having:
a second propeller assembly arranged to rotate in an opposite direction to the first propeller assembly, the gear assembly also driving the second propeller assembly, and
a second pitch control mechanism according to the first aspect for angular displacement of propellers of the second propeller assembly;
wherein the drive and control gears of the second pitch control mechanism are mounted to the projecting portion of the static conduit such that a second power line for powering the variable rotation of at least one of the drive gear and the control gear of the second pitch control mechanism can be routed along the static conduit. Thus the engine arrangement, when used for a contra-rotating engine, can provide pitch control for both propeller assemblies.

Preferably, the second pitch control mechanism further has a second electric motor for powering the variable rotation of the second pitch control mechanism. Conveniently, the second motor can also be mounted to the projecting portion of the static conduit, and the second power line can be an electrical power line extending to the second motor.

The engine arrangement may further have a power source, such as an electrical generator, from which the power line(s) extend. The power source can be attached to an engine accessory gearbox.

Typically, the gear assembly is an epicyclic gear assembly having e.g. a sun gear, and planetary gears driven by the sun gear and in turn driving a carrier. For example, the power drive shaft can drive the sun gear, and the carrier can drive the first propeller assembly. The epicyclic gear assembly may further have a ring gear driven by the planetary gears. In the context of a contra-rotating engine, the ring gear can drive the second propeller assembly.

Conveniently, the static conduit may penetrate an epicyclic gear assembly through the sun gear, which can help to avoid or reduce detrimental effects on gear assembly stiffness. Further, even if the gear assembly malfunctions, the ability of the power line or lines to power the variable rotation, and hence the ability to control the pitch of the propellers, is unlikely to be compromised.

The first propeller assembly may be located at the first side of the gear assembly, and the epicyclic gear system of the first pitch change mechanism may be located at the second side of the gear assembly, the drive mechanism of the first pitch change mechanism penetrating through the gear assembly. Such an arrangement may be adopted, for example, in relation to a contra-rotating engine. Thus when the gear assembly is an epicyclic gear assembly and the first propeller assembly is driven by a carrier of the gear assembly, the drive mechanism of the first pitch change mechanism may penetrate through the carrier of the gear assembly.

In the context of an engine arrangement for a contra-rotating engine, the second propeller assembly and the epicyclic gear system of the second pitch change mechanism are preferably located at the second side of the gear assembly. The drive mechanism of the second pitch change mechanism can then extend relatively unimpeded from its epicyclic gear system to the second propeller assembly.

A third aspect of the present invention provides a gas turbine engine having an engine arrangement according to the second aspect with a gear assembly and static conduit arrangement, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially rearwardly from the power turbine section, wherein a forward mouth of the static conduit opens to a gap formed between the forwardly extending generator drive shafts and the rearwardly extending power drive shaft, the, or each, power line entering the static conduit at said mouth.

The gap thus provides a convenient means for routing the power supply line(s) into the static conduit.

The engine may have any one or, to the extent they are compatible, any combination of the following optional features.

Typically, the gas turbine engine is axially aligned with the gear assembly, which is preferably an epicyclic gear assembly.

The gas turbine engine may have a row of nozzle guide vanes located at said gap, the, or each, power line being routed through a nozzle guide vane to arrive at said mouth. The nozzle guide vanes can thus protect the power line(s) from high working gas temperatures at the exit of the generator section of the engine.

Embodiments of the invention will now be described by way of example with reference to the accompanying drawings in which.

Figure 1:
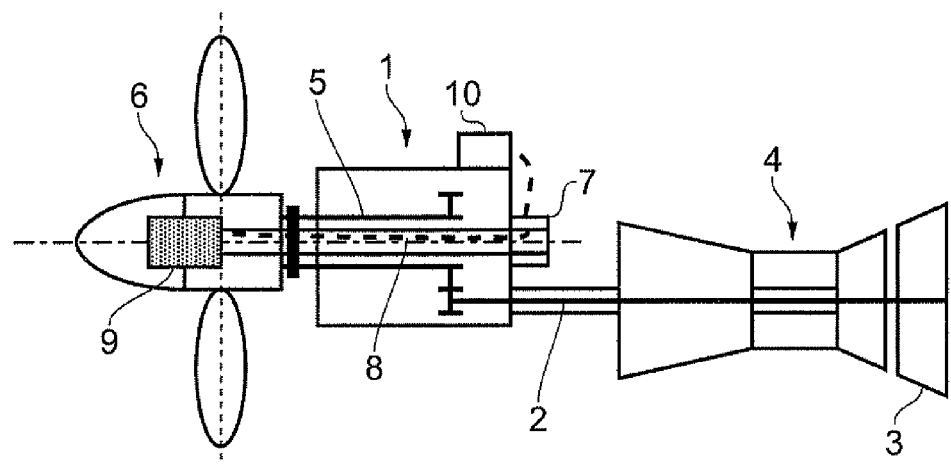
FIG. 1 shows a schematic longitudinal cross-section through a conventional single propeller turboprop engine with a step-aside shaft configuration.
Figure 2:
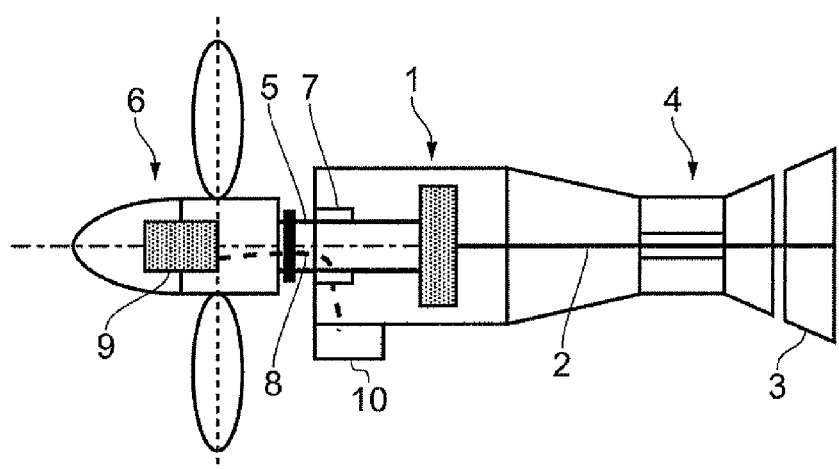
FIG. 2 shows a schematic longitudinal cross-section through a conventional single propeller turboprop engine with an in-line shaft configuration.
Figure 3:
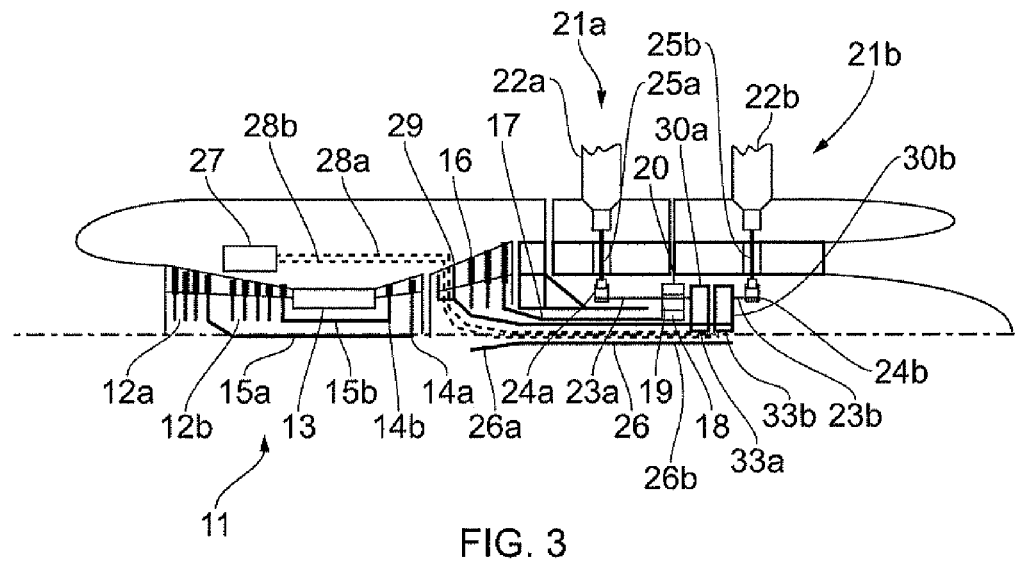
FIG. 3 shows a schematic longitudinal cross-section through a pusher style, contra-rotating propeller, turboprop engine with an in-line shaft configuration according to an embodiment of the present invention.

An engine according to an embodiment of the present invention is shown in FIG. 3. The engine has a generator section 11 comprising in flow series low pressure 12a and high pressure 12b compressor subsections, a combustor subsection 13, and high pressure 14b and low pressure 14a turbine subsections. Generator drive shafts 15a, 15b connect the respective compressor and turbine subsections. Downstream of the generator section is a free power turbine 16 which drives a rearwardly extending power drive shaft 17.

The distal end of the power drive shaft 17 drives a sun gear 18 of an epicyclic gear assembly which is coaxial with the power drive shaft. The sun gear drives planetary gears 19, which in turn drive a carrier (not shown) and a ring gear 20. The carrier and ring gear rotate in opposite directions. The carrier drives a first propeller assembly 21a on the upstream side of the gear assembly, while the ring gear drives a contra-rotating second propeller assembly 21b on the downstream side of the gear assembly. Each propeller assembly has a row of propeller blades 22a, 22b, with each blade being rotatable about its longitudinal axis to vary the blade pitch. The pitch variation for each propeller assembly is achieved by a respective pitch control mechanism (described below in more detail with reference to FIG. 4) having an electric motor 33a, 33b, drive 31 and control 32 gears, an epicyclic gear system (30a, 30b), and a drive mechanism based on a ball screw 23a, 23b for delivering an output motion which moves a corresponding unison ring 24a, 24b in the axial direction of the engine. The axial movement of the unison rings rotates the blades via a quill shaft and lever or cam follower arrangement 25a, 25b which extends from the base of each blade.

The power drive shaft 17 is hollow and a static conduit 26 extends along the internal cavity formed by the shaft. One end of the static conduit opens to a mouth 26a at the gap formed between the forward end of the power drive shaft and the rearward end of the low pressure generator drive shaft 15a. The other end of the static conduit penetrates through the centre of the sun gear 18 to form a projection 26b on the downstream side of the gear assembly. A power source 27, such as a generator, for providing electrical power for the pitch control mechanisms is attached to an accessory gearbox (not shown) of the engine remote from the actuators pitch control mechanisms.

To transfer electrical power between the power source 27 and the electric motors 33a, 33b of the pitch control mechanisms, respective power lines 28a, 28b are routed from the source to the mouth 26a of the static conduit 26. The power lines traverse the working gas annulus of the engine through a row of nozzle guide vanes 29 which are located between the generator section 11 and the free power turbine 16. This arrangement protects the power lines from the high temperatures of the working gas. From the mouth of the static conduit, the supply lines are routed along the static conduit's internal cavity to arrive at the projection 26b on the downstream side of the gear assembly. The electric motors (33a, 33b) are mounted to the projection, the upstream one being a part of the pitch control mechanism of the first propeller assembly 21a and the downstream one being a part of the pitch control mechanism of the second propeller assembly 21b.

The static conduit 26 can also be used to route other power control or lubrication lines through the engine, these lines being e.g. hydraulic or electrical.

Figure 4:
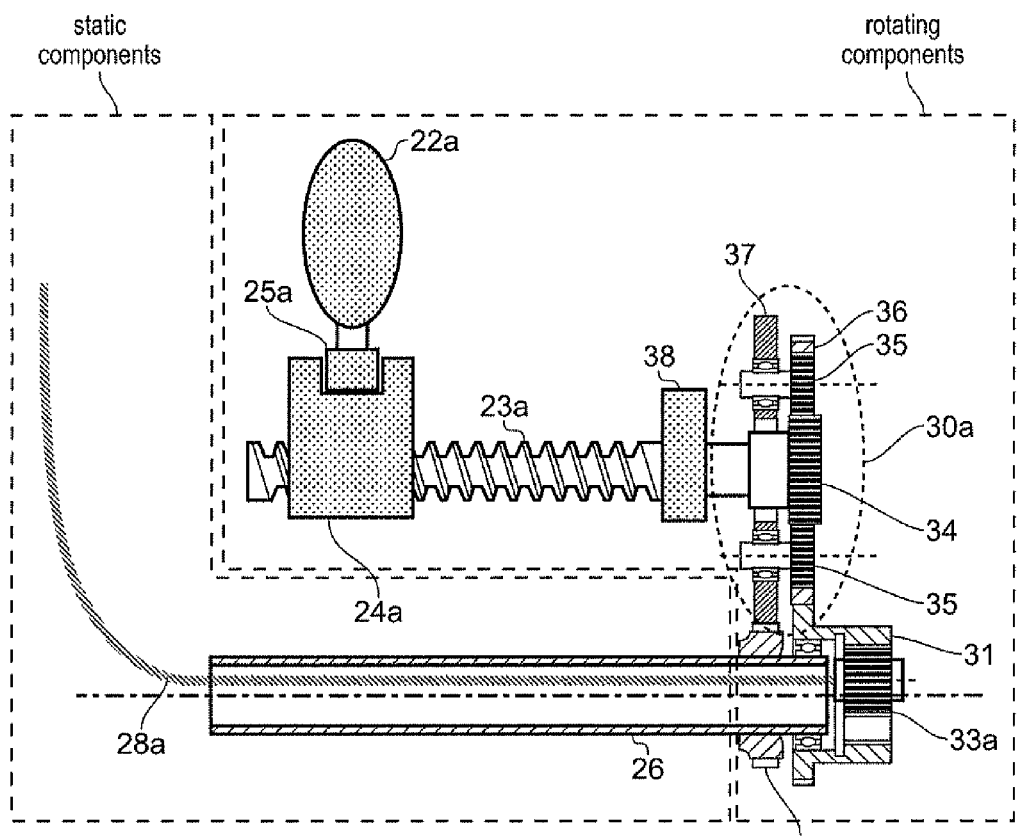
FIG. 4 shows schematically detail of a pitch control mechanism for angularly displacing the propeller blades of a propeller assembly of the engine of FIG. 3.

FIG. 4 shows schematically detail of the pitch control mechanism for angularly displacing the propeller blades 22a of the first propeller assembly 21a of the engine of FIG. 3. For clarity, extension of the static conduit 26 in the rearward direction beyond the motor 33a of the first pitch control mechanism is not shown. Features common to FIGS. 3 and 4 share the same reference numbers. The dashed outlines divide components between those that are statically mounted and those that rotate with the first propeller assembly.

In the rotating frame of reference of the first propeller assembly 21a, the pitch control mechanism has an epicyclic gear system 30a comprising a sun gear 34, planet gears 35 which surround and mesh with the sun gear, and a ring gear 36 which surrounds and meshes with the planet gears. A planet carrier 37 carries the planet gears. The planet carrier and the ring gear are inputs to the epicyclic gear system and the sun gear is an output to epicyclic gear system. A shaft 38 extends forward from the axis of the sun gear, passing through the planet carrier to drive intermediate gearing 39. One end of a ball screw 23a accepts rotary motion from the intermediate gearing. The other end of the ball screw is threadingly engaged to the unison ring 24a of the first propeller assembly. The unison ring is prevented from rotating relative to the first propeller assembly and the ball screw. Thus the rotary motion of the ball screw is converted into forward or aft axial movement of the unison ring, depending on the direction of rotation of the ball screw. As mentioned previously, the axial movement of the unison ring rotates the blades 22a of the first propeller assembly via a quill shaft and lever or cam follower arrangement 25a which extends from the base of each blade.

Whether the blades 22a rotate in the "to fine" or "to coarse" direction therefore depends on the direction of rotation of the sun gear 34. This in turn is controlled by the relative movement of the planet carrier 37 and the ring gear 36. Thus located in the static from of reference, the pitch control mechanism has a drive gear 31 and a control gear 32, both mounted to the projection 26b at the is rearward end of the static conduit 26. The drive gear meshes with the ring gear, and the control gear meshing with the planet carrier. The drive and control gears both encircle the static conduit so that the ring gear and planet gear remain meshed as the first propeller assembly rotates.

The control gear 32 is static, i.e. it does not rotate about the axis of the static conduit 26. The drive gear 31, on the other hand, is powered by the electric motor 33a and can be rotated about the axis of the static conduit. The ratio of the control gear and the planet carrier 37 and the ratio of the drive gear and the ring gear 36 are selected, however, so that, when the drive gear is not rotated, the planet carrier and ring gear inputs to the epicyclic gear system 30a cancel out, whereby the sun gear 34 remains static in the rotating frame of reference of the first propeller assembly 21a. Thus, when the drive gear is static, the blades 22a are not rotated.

In contrast, when the drive gear 31 is rotated in one direction, the sun gear 34 and blades 22a rotate in a corresponding direction, and, when the drive gear 31 is rotated in the opposite direction, the sun gear 34 and blades 22a also rotate in the opposite direction. Thus merely varying the direction of rotation of the drive gear controls whether the blades move "to fine" or "to coarse". The speed and duration of rotation of the drive gear determines the extent of rotation of the blades.

As shown in FIG. 3, the ball screw 23b of the pitch change mechanism for the second propeller assembly 21b can extend unimpeded from the epicyclic gear system 30b to the unison ring 24b of the second propeller assembly. In contrast, the ball screw 23a of the pitch change mechanism for the first propeller assembly 21a has to pass through the epicyclic gear assembly at the distal end of the power drive shaft 17. Conveniently, however, the ball screw 23a can be routed between the planetary gears 19 and through the carrier of the epicyclic gear assembly, as the carrier rotates with the first propeller assembly.

Advantageously, the pitch control mechanism provides a relatively simple method of transferring mechanical pitch control signals through a rotating interface, thereby allowing control without rotating hydraulic couplings, slip rings, wireless or electromagnetic rotating transfer devices.

All the components of the pitch control mechanism can be located in positions which allow ready access for maintenance, cooling etc.

Gearing in the pitch control mechanism does not need to be compounded. Therefore gearing efficiency can be improved, and power and heat losses, weight, and gear wear can be reduced.

While the invention has been described in conjunction with the exemplary embodiments described above, many equivalent modifications and variations will be apparent to those skilled in the art when given this disclosure. For example, although the invention has been described above in relation to aero engines, it could also be applied to marine engines. Accordingly, the exemplary embodiments of the invention set forth above are considered to be illustrative and not limiting. Various changes to the described embodiments may be made without departing from the spirit and scope of the invention.

All references mentioned above are incorporated by reference.

The invention claimed is:

1. A pitch control mechanism for angular displacement of propellers of a propeller assembly of an engine arrangement, the pitch control mechanism having:
    an epicyclic gear system rotating with the propeller assembly and comprising a sun gear, one or more planet gears engaging the sun gear, a ring gear engaging the planet gears, and a planet carrier carrying the planet gears, one of the sun gear, the ring gear and the planet carrier being a first input to the epicyclic gear system, another of the sun gear, the ring gear and the planet carrier being a second input to the epicyclic gear system, and the last of the sun gear, the ring gear and the planet carrier being an output from the epicyclic gear system,
    a drive gear located on a static structure of the engine arrangement, and controlling the rotational speed of the first epicyclic input in the rotating frame of reference of the propeller assembly,
    a control gear located on a static structure of the engine arrangement, and controlling the rotational speed of the second epicyclic input in the rotating frame of reference of the propeller assembly, and
    a drive mechanism rotating with the propeller assembly, the drive mechanism accepting rotary motion from the epicyclic output to deliver an output motion which angularly displaces the propellers of the propeller assembly;
    wherein varying a rotation of at least one of the drive gear and the control gear varies the direction of rotation of the epicyclic output, and thereby changes the output motion delivered by the drive mechanism to control the angular displacement of the propellers of the propeller assembly.

2. A pitch control mechanism according to claim 1, wherein the ring gear is the first epicyclic input, the planet carrier is the second epicyclic input, and the sun gear is the epicyclic output.

3. A pitch control mechanism according to claim 1, wherein one of the drive gear and control gear is static and the other of the drive gear and control gear is variably rotatable.

4. A pitch control mechanism according to claim 1, wherein the gear ratio of the drive gear to the first epicyclic input and the gear ratio of the control gear to the second epicyclic input are selected such that, when both the drive gear and the control gear are static, the epicyclic output is static in the rotating frame of reference of the propeller assembly.

5. A pitch control mechanism according to claim 1, wherein the drive mechanism comprises a screw and an actuation member which is threadingly but non-rotatably engaged to one end of the screw, the other end of the screw accepting rotary motion from the epicyclic output, such that the rotary motion is converted into translational output motion of the actuation member.

6. An engine arrangement having:
   a first propeller assembly, and
   a first pitch control mechanism according to claim 1 for angular displacement of propellers of the first propeller assembly.

7. An engine arrangement according to claim 6 further having:
   a gear assembly that drives the first propeller assembly, the gear assembly being driven by a power drive shaft that joins to the gear assembly at a first side thereof, the power drive shaft having a longitudinally extending internal cavity,
   a static conduit which extends along the internal cavity of the power drive shaft, the conduit penetrating the gear assembly such that a portion of the conduit projects from an opposing second side of the gear assembly;
   wherein the drive and control gears of the first pitch control mechanism are mounted to the projecting portion of the static conduit such that a first power line for powering the variable rotation of at least one of the drive gear and the control gear can be routed along the static conduit.

8. An engine arrangement according to claim 7 which is for a contra-rotating engine, the arrangement further having:
   a second propeller assembly arranged to rotate in an opposite direction to the first propeller assembly, the gear assembly also driving the second propeller assembly, and
   a second pitch control mechanism according to claim 1 for angular displacement of propellers of the second propeller assembly;
   wherein the drive and control gears of the second pitch control mechanism are mounted to the projecting portion of the static conduit such that a second power line for powering the variable rotation of at least one of the drive gear and the control gear of the second pitch control mechanism can be routed along the static conduit.

9. An engine arrangement according to claim 7, wherein the gear assembly is an epicyclic gear assembly having a sun gear, and planetary gears driven by the sun gear and in turn driving a carrier.

10. An engine arrangement according to claim 9, wherein the static conduit penetrates the epicyclic gear assembly through the sun gear thereof.

11. An engine arrangement according to claims 7, wherein the first propeller assembly is located at the first side of the gear assembly, and the epicyclic gear system of the first pitch control mechanism is located at the second side of the gear assembly, the drive mechanism of the first pitch change mechanism penetrating through the gear assembly.

12. An engine arrangement according to claim 9, wherein
   the drive mechanism of the first pitch control mechanism penetrates through the carrier of the gear,
   the first propeller assembly is located at the first side of the gear assembly,
   the epicyclic gear system of the first pitch control mechanism is located at the second side of the gear assembly, and
   the drive mechanism of the first pitch change mechanism penetrates through the gear assembly.

13. A gas turbine engine having an engine arrangement according to claim 7, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially rearwardly from the power turbine section,
   wherein a forward mouth of the static conduit opens to a gap formed between the forwardly extending generator drive shafts and the rearwardly extending power drive shaft, the, or each, power line entering the static conduit at said mouth.

14. A gas turbine engine according to claim 13 wherein a row of nozzle guide vanes are located at said gap, the, or each, power line being routed through a nozzle guide vane to arrive at said mouth.

* * * * *